United States Patent [19]

Montgomery et al.

[11] Patent Number: 4,703,573
[45] Date of Patent: Nov. 3, 1987

[54] VISUAL AND AUDIBLE ACTIVATED WORK AND METHOD OF FORMING SAME

[76] Inventors: John W. Montgomery, 1307 Lodema, Duncanville, Tex. 75116; Earl H. Oliver, 2516 St. Anthony Rd., Minneapolis, Minn. 55418; Alfred E. Hall, 14943 Hillcrest Rd.; John L. Sigalos, 7335 Tophill Cir., both of Dallas, Tex. 75248

[21] Appl. No.: 698,161

[22] Filed: Feb. 4, 1985

[51] Int. Cl.[4] ............................................. G09F 27/00
[52] U.S. Cl. .................................... 40/455; 40/124.1; 434/169; 434/317
[58] Field of Search ................ 40/455, 124.1, 457, 40/906; 434/308, 309, 311, 317, 167, 169

[56] References Cited

U.S. PATENT DOCUMENTS

| | | | |
|---|---|---|---|
| 2,524,143 | 10/1950 | Smith | 434/317 |
| 2,826,844 | 3/1958 | Leika | 40/152.2 |
| 3,798,806 | 3/1974 | Sanford | 40/124.1 |
| 4,055,014 | 10/1977 | Schmidt et al. | 40/442 |
| 4,102,067 | 7/1978 | Tarrant | 40/455 |
| 4,158,264 | 6/1979 | Orth | 434/311 |
| 4,209,824 | 6/1980 | Kaufman | 40/124.1 |
| 4,222,188 | 9/1980 | Tarrant et al. | 40/455 |
| 4,286,399 | 9/1981 | Funahashi et al. | 40/124.1 |
| 4,299,041 | 11/1981 | Wilson | 40/124.1 |
| 4,363,081 | 12/1982 | Wilbur | 40/124.1 |
| 4,497,126 | 2/1985 | Dejean | 40/124.1 |
| 4,531,310 | 7/1985 | Acson et al. | 40/455 |

FOREIGN PATENT DOCUMENTS

81/02215  8/1981  PCT Int'l Appl. ................... 40/455

Primary Examiner—Robert P. Swiatek
Assistant Examiner—Cary E. Stone
Attorney, Agent, or Firm—Sigalos & Levine

[57] ABSTRACT

An activated work comprising at least two turnable pages pivotably attached to one edge of each of the pages so that the pages are pivotable from a juxtaposed closed position to an adjacent opened position, a visual image display affixed to one of the pages, the visual image display having a first visual activation state at which a visual image is not visible thereon and a second visual activation state at which a visual image is visible thereon, a sound generator attached to the work having a first activation state at which an audible sound is not generated and a second activation state at which an audible sound is generated, connected to the visual display for selectively activating the visual display from one of the visual activation states to another upon pivoting the pages from the open position to the closed position, and connected to the sound generator for selectively activating the sound generator from one of the sound activation states to another upon pivoting the pages from the closed position to the opened position or from the opened position to the closed position.

46 Claims, 22 Drawing Figures

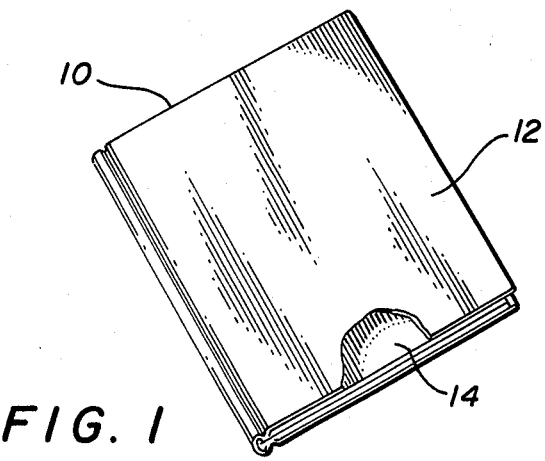
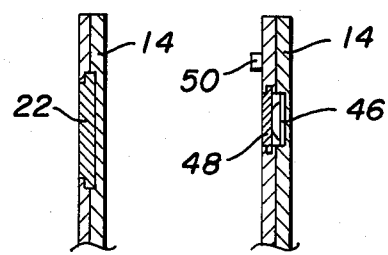
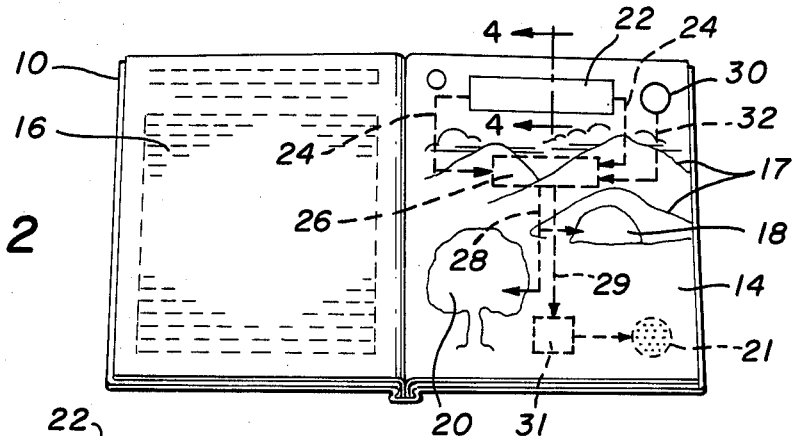
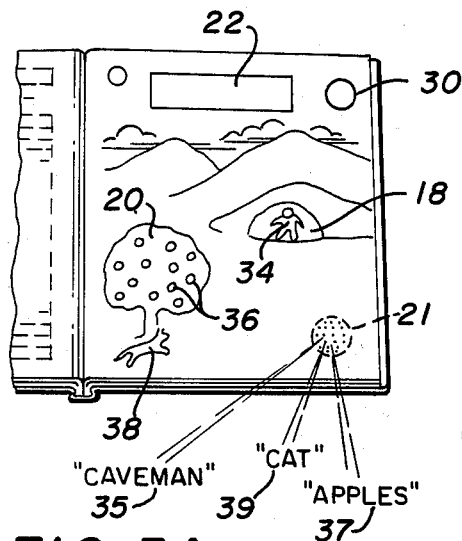
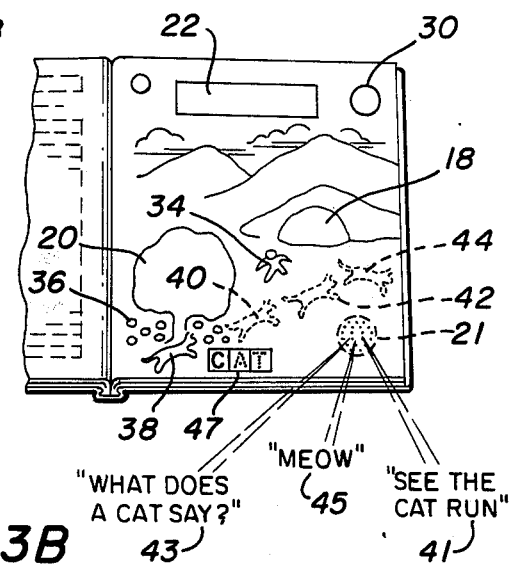
FIG. 1   FIG. 4A   FIG. 4B   FIG. 2   FIG. 3A   FIG. 3B

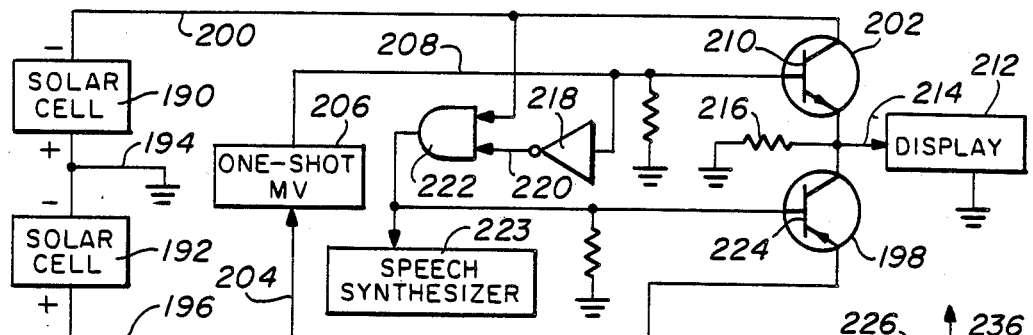
FIG. 12
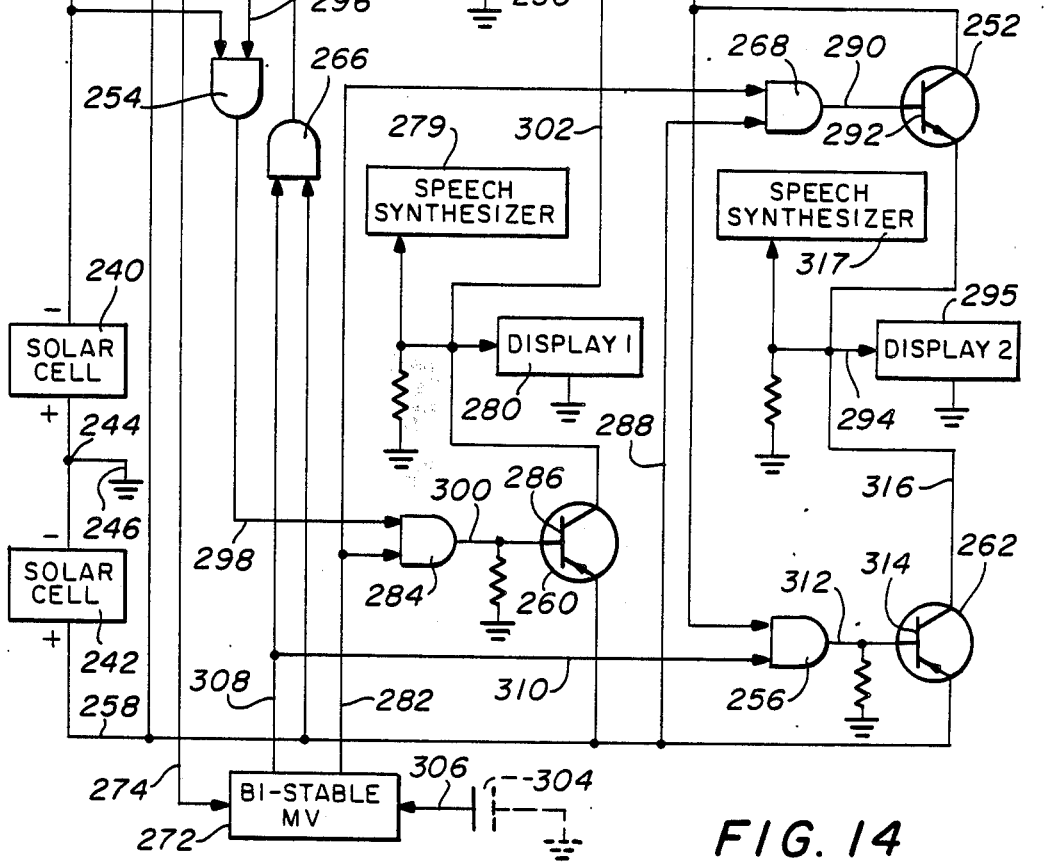
FIG. 13
FIG. 14

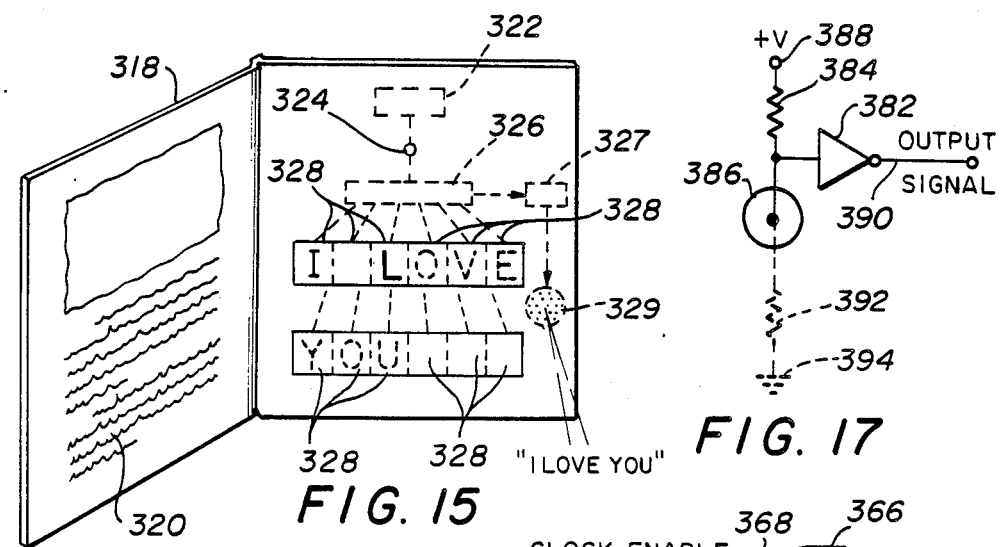
FIG. 15
FIG. 17
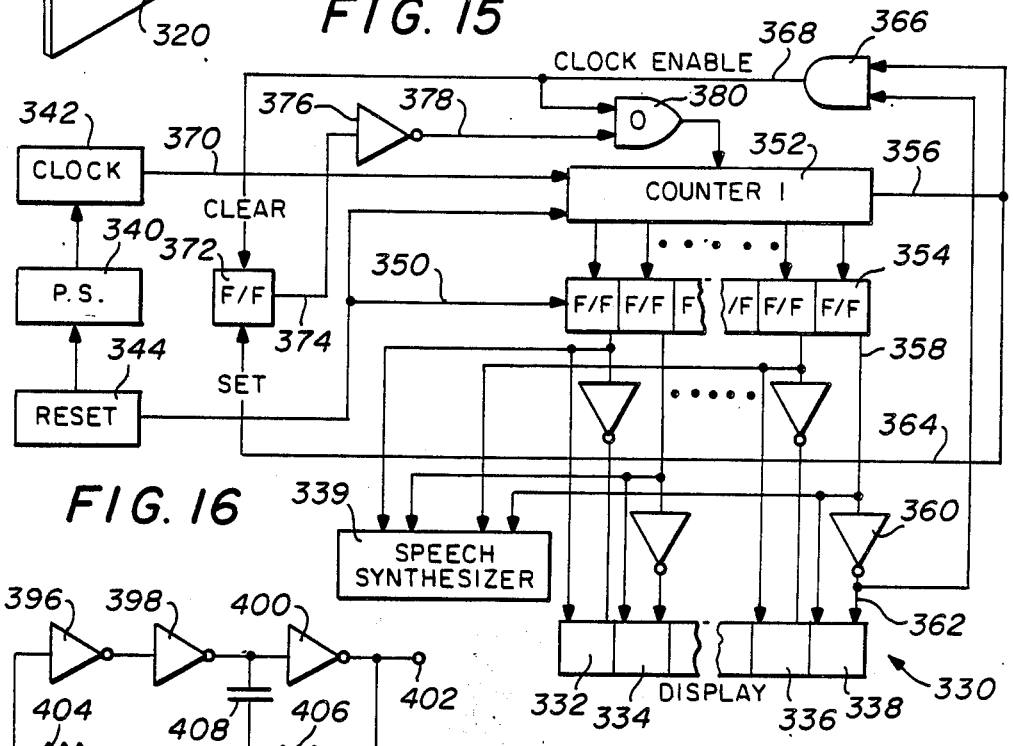
FIG. 16
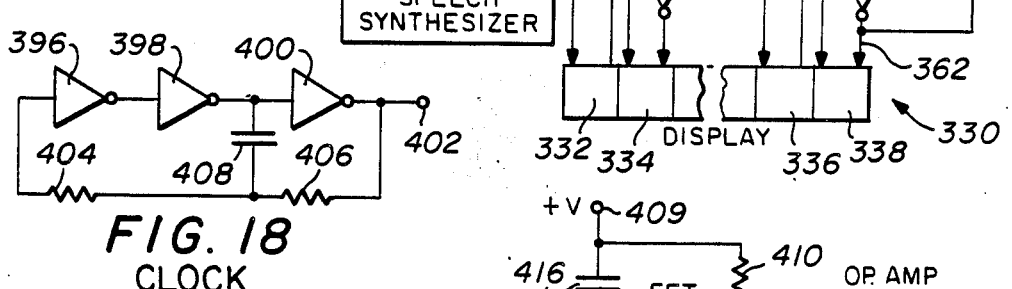
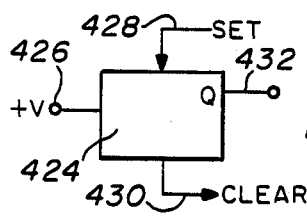
FIG. 18
CLOCK
FIG. 20
F/F
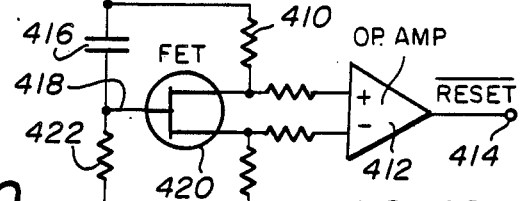
FIG. 19
RESET

VISUAL AND AUDIBLE ACTIVATED WORK AND METHOD OF FORMING SAME

FIELD OF THE INVENTION

The present invention relates to a novel and unique visual and audible activated work such as a child's book or a greeting card having at least two turnable pages in juxtaposed relationship and which is formed having a visual display thereof that is essentially invisible in a first state but visible in a second state and a sound synthesizer which is inactive during said first state and actively generates sound during said second state. Electrical signals are coupled to the visual display and sound synthesizer for selectively and reversibly changing the visual display from the invisible to the visible state and the sound synthesizer from the inactive to sound generating state when the pages are moved from their juxtaposed relationship.

BACKGROUND OF THE INVENTION

There exists in the state of the art electro-optical devices exhibiting a phenomenon known as persistent electrochromism wherein electromagnetic radiation absorption characteristics of a persistent electrochromic material are altered under the influence of an electric field. Such devices are employed in sandwich arrangement between two electrodes. Coloration is induced by charging the electrochromic field negative with respect to the counter electrode which can be the same as the persistent electrochromic material or different. By reversing the original polarity of the field or by applying a new field it is possible to cancel, erase or bleach the visible coloration. These steps of color induction and erasure are defined as cycling. As described in U.S. Pat. No. 3,978,007, persistent electrochromic material is defined as a material responsive to the application of an electric field of a given polarity to change from a first persistent state in which it is essentially non-absorptive of electromagnetic radiation in a given wave length region to a second persistent state in which it is absorptive of electromagnetic radiation in the given wave length region and once in said second state is responsive to the application of an electric field of the opposite polarity to return to its first state. Certain of such materials can also be responsive to a short circuiting condition, in the absence of an electric field, so as to return to the initial state. Further, by "persistent" is meant the ability of the material to remain in the absorptive state to which it is changed after removal of the electric field as distinguished from a substantially instantaneous reversion to the initial state.

Thus, in this case, the device functions by applying an EMF to the electrodes to cause coloration or a visible display of the electrochromic layer receiving the applied EMF. By reversing the polarity of the two electrodes and applying an EMF, the colored electrochromic layer will be uncolored (erased or made invisible) by the reverse flow of current. The film will be persistent in either its colored (visible) state or its non-colored (invisible) state without the need for a continuous current or EMF to maintain the state. See also U.S. Pat. No. 4,344,674.

As stated in U.S. Pat. No. 4,174,152 the exact mechanism of persistent electrochromism is unknown but the coloration is observed to occur at the negatively charged electrochromic layer. Generally, the phenomenon of persistent electrochromism is believed to involve transport of cations, such as hydrogen or lithium ions, to the negative electrode where color centers form in the electrochromic image layer as a result of charged compensating electron flow. As stated in the prior patents, voltages of less than two volts d.c. applied to the layers of the electrochromic material will bring about the color change and reversal. Thus, the devices require very little current or power to operate and yet can be effectively colored (made visible) and discolored (made invisible) by the reversal of the small voltage potential to the material.

It is also known that liquid crystals work in a similar manner wherein liquid crystals used in displays are not optically active but instead change their light scattering characteristics when a voltage is applied across a liquid crystal film between two closely spaced conductive sheets. With no applied voltage, the crystalline structure is orderly and the material is clear and invisible; with voltage applied, the light is scattered and the layer becomes opaque and visible. Liquid crystals have been classified into three categories: nematic, cholesteric and smectic. The nematic and cholesteric phases are liquid which have optical properties. The optical absorption spectrum of a pleochroic dye molecule is a function of its molecular orientation with respect to the polarization of the incident light. If the dye molecule is oriented with its long axis parallel to the electric vector of incident polarized light, absorption of the light by the molecule occurs, and an observer sees the characteristic color of the dye. Conversely, if the dye molecules have their long axis perpendicular to the electric vector, little or no absorption occurs and the incident light is transmitted unchanged.

Nematic compounds have a strong dipole moment on the molecule's main axis and thus orient dye molecules in color switching devices. Such electronic color switching relies on the introduction of dyes composed of pleochroic molecules. To orient the dye with respect to the field to produce the desired color changes requires the use of a nematic liquid crystal that has different properties than the type used for dynamic scattering. The nematic material to which the dye is added must have an extremely strong dipole moment operating along the long axis of the molecules instead of one operating at an angle with this axis. When a voltage is applied, this moment will align with the field. This causes the dye molecules to also align with the field resulting in the disappearance of the color of the dye. Removal of the voltage collapses the field; the nematic host molecules with their dye guest realign in their original configuration and the cell returns to its original color. See Joseph A. Castellano, "Now That The Heat Is Off, Liquid Crystals Can Show Their Colors Everywhere", *Electronics*, pages 64–69, July 6, 1970. See also *"The Bulletin of Arthur D. Little, Inc.,* No. 488, March-April, 1971.

Further, it is well known that one of the most striking transformations of the optical properties of the cholesteric phase of liquid crystals are those due to temperature changes. Although cholesteric materials are substantially colorless in the isotropic liquid phase, when they are cooled through their clearing temperatures, some pass through a series of colors as viewed in reflected light. Some change only from red to green on cooling; others change from red to green to blue or from red to green and back to red; some are initially blue and change to green and then red. The most remarkable property is that each color corresponds to an exact temperature of the cholesteric material. The rate of color change, the temperature at which specific colors occur and the direction of shift are predictable. See James L. Ferguson et al, "Liquid Crystals And Their Applications" *Electro-Technology,* page 41, January, 1970.

These phenomena are discussed in U.S. patent application Ser. No. 553,102 for Activated Work and Method for Forming Same, in connection with an activated work, such as a book, pamphlet, greeting card and the like, which has at least one portion formed of electrochromic or liquid crystal material and being essentially invisible in its first deactivated state and visible in a second activated state. A power supply is coupled to the material for selectively activating or deactivating the material and causing said portion to be visible or invisible. Thus, if a book had a page with a picture of a mountain having a cave entrance, one could cause a figure to appear in the mouth of the cave. At a desired time later, the figure could be caused to disappear from the cave entrance again. Another example may be a tree which at first has nothing on it but later has apples appearing on it. Still later, the apples could be made to disappear from the tree and appear on the ground. Another example could be a running animal formed from a series or sequence of pictures which appear and disappear to cause the animal to appear to be running across the page.

In a greeting card, one portion of the card could be a visible picture or message and when the card is opened, a second display or message could be made visible. The second message could be made to appear at one time or letter by letter in sequential succession.

While the invention disclosed in U.S. patent application Ser. No. 553,102 filed Nov. 17, 1983 is extremely useful, it can be used better as a teaching aid with the use of speech synthesis devices which can be constructed to operate in conjunction with the formation of pictures such as letters in order to improve learning capabilities. For instance, whenever a picture of a cat is shown and the corresponding letter C is presented the voice may state "C", when the A is presented, the voice can indicate "A", and when the letter T appears, the voice can state "T" and then, of course, the entire word "CAT" could be voiced by the synthesizer. Speech synthesis, the production of intelligible speech from computer data, is no longer a novelty. Speech chips are available with limited vocabulary at a quality level comparable to that of tape recorders. They can create phrases from 200 or 300 preselected words. Many different companies have developed and marketed speech chips. A good example of a speech synthesizer chip is the TMS5100 which was developed by Texas Instruments for educational uses. The electronic circuit contained on a semiconductor chip produces electrical impulses convertable into simulated human speech with an electronically activated speaker electrically connected to the semiconductor chip for receiving said electrical impulses and converting them into sound simulating human speech.

Further, by using speech synthesis in conjunction with the message being made visible learning could be reinforced or a message made more attractive. Speech synthesis techniques, per se, are old and well known in the art as disclosed by Gene A. Frantz et al, Design case history: Speak & Spell learns to talk, *IEEE Spectrum,*- February 1982, pp. 45–49 and Eve J. Lerner, Products That Talk, *IEEE Spectrum,* July 1982, pp. 32–37. Using such techniques with the present invention adds the sense of hearing to the sense of sight to give added perception to learning and added meaning to a sentimentality. Thus, a picture of an animal such as a cat could have added the letters C, A and T appearing in sequence and, as each letter appears, the speech synthesizer circuit would sequentially produce the sounds of the letters C, A and T in conjunction with the sequential appearance of the letters. In a card, when opened, a message could appear, either in its entirety in conjunction with the vocal presentation of the message or the message could appear letter by letter with the voice articulating each word as the letters are sequentially spelled. For instance the entire message "I LOVE YOU" could be made to appear simultaneously with the sounds of the words. In like manner, the message could be made to appear one letter at a time with the voice speaking at the end of each word. Thus, after the letter "I" appears, the voice repeats "I". After the word "LOVE" has been spelled the voice repeats "LOVE". After the word "YOU" has been spelled, the voice repeats "YOU". Then the voice could repeat the entire message: I LOVE YOU.

Thus, it is an object of the present invention to provide a voice circuit coordinated with a visual presentation so that the voice reinforces the visual presentation.

It is a further object of the present invention to provide a book having a first scene that is visible and a second scene that is invisible in a first state and visible in a second state and a voice circuit for producing a sound representing the second scene when said second scene is made visible.

It is also an object of the present invention to provide a card or activated work having a message or pictorial representation made visible upon opening of said card or activated work and a voice circuit for producing a speech in coordination with the appearance of the message or pictorial representation.

SUMMARY OF THE INVENTION

Thus, it is an object of the present invention to provide an activated book comprising at least two turnable pages pivotally attached at one edge of each of said pages so that said pages are pivotable from a juxtaposed closed position to an adjacent open position; a visual image display means affixed to one of said pages, said visual image display having a first visual activation state at which a visual image is not visible thereon and a second visual activation state at which a visual image is visible thereon; a sound generating means attached to said book having a first activation state at which an audible sound is not generated and a second activation state at which an audible sound is generated; means connected to said visual display means for selectively activating said visual display means from one of said visual activation states to another upon pivoting said pages from said closed position to said opened position or from said opened position to said closed position; and means connected to said sound generating means for selectively activating said sound generating means from one of said sound activation states to another upon pivoting said pages from said closed position to said opened position or from said opened position to said closed position.

It is also an object of the present invention to provide a power source forming said means for selectively activating said sound generating means, and means for energizing said power source whenever the preceding pages turn to its open position and de-energizing said power source whenever the preceding page is returned to its closed position.

It is still another object of the present invention to provide an activated book wherein said sound generating means comprises an electronic speech synthesizer.

It is still another object of the present invention to provide an activated work having at least two turnable pages in juxtapose relationship and having on the inside a first fixed scene to be viewed and a second scene interposed with said first scene and that is essentially invisible in a first state and is visible in a second state, alphabet letters related to said invisible scene which are invisible in a first state and visible in a second state, a speech synthesizer and means coupled to said visual work such that when said pages are moved from their juxtaposed relationship, said invisible scene becomes visible, said invisible letters associated with said scene become visible and said speech synthesizer produces sounds representing the alphabet letters as they are generated.

BRIEF DESCRIPTION OF THE DRAWINGS

These and other more detailed objects and advantages of the present invention will be seen in relation to the accompanying drawings in which:

FIG. 1 is a diagrammatic representation of a work, preferably a child's book, having a section removed to indicate the pages under the cover;

FIG. 2 is a diagrammatic representation of the work of FIG. 1 in its open condition showing text on the left side and a first scene on the opposite page and circuitry coupled to the first scene which could be utilized to cause a second scene to appear and disappear and a speech synthesizer for producing speech relating to said scene when it appears;

FIG. 3A is a diagrammatic representation of the open work in FIG. 2 after the second scene is caused to appear showing apples on a tree and a figure in a cave entrance and an animal under the tree and illustrating the synthesized speech relating to the tree, the figure and the animal;

FIG. 3B is a schematic representation of the open work of FIG. 3A in which the figure has moved from the cave entrance, the apples are now lying under the tree, and the animal is moving across the page and illustrating synthesized speech relating to the animal;

FIG. 4A is a cross sectional representation of the power supply in FIG. 2 illustrating the use of a solar cell as the power source;

FIG. 4B is also a cross sectional view of the power supply in FIG. 2 illustrating the use of a battery as the power supply and having a cover thereon and a switch which is operable by opening or closing the work to activate or deactivate the battery;

FIG. 12 is a schematic circuit diagram of an alternate embodiment of the circuit for driving a display and/or a speech synthesizer with alternate polarity voltages to cause the display to first be in the invisible state and then to change to the visible state and/or to cause the speech synthesizer to change from a silent state to an audible state;

FIG. 13 is a circuit diagram of the manner in which a phototransistor may be used in the ground circuit of the power supply to cause the power supply to be operative when the pages of the work are turned or circumstances are such that light can strike the phototransistor;

FIG. 14 is an alternate embodiment of a circuit diagram for driving two displays wherein both displays are first driven to the invisible state and speech synthesizers are driven to a silent state, the first display is then driven to the visible state and the speech synthesizer is driven to an audible state, and upon operation of a touch switch, the first display is driven back to the invisible state and the sound is silent, and the second display is simultaneously driven to the visible state and the speech synthesizer is driven to an audible state;

FIG. 15 is an alternate embodiment of the invention illustrating an activated work such as a greeting card wherein the individual letters of an invisible message are visibly spelled out sequentially upon the opening of the card while simultaneously the speech synthesizer repeats the words or letters printed;

FIG. 16 is a schematic diagram of a circuit which can be used to cause the letters of the message and/or the synthesized speech in the greeting card of FIG. 15 to appear and be produced sequentially;

FIG. 17 is a circuit diagram illustrating a circuit which could be used as a capacitive touch switch to cause a first display to become invisible and a second display to become visible or to cause speech to be produced;

FIG. 18 is a circuit diagram of a clock that can be used in the circuit of FIG. 16;

FIG. 19 is a circuit diagram of a reset monostable multivibrator which can be used as the reset circuit in FIG. 16; and FIG. 20 is a circuit diagram of a flip flop that can be used in the circuit of FIG. 16.

DETAILED DESCRIPTION OF THE DRAWINGS

Figure 5:
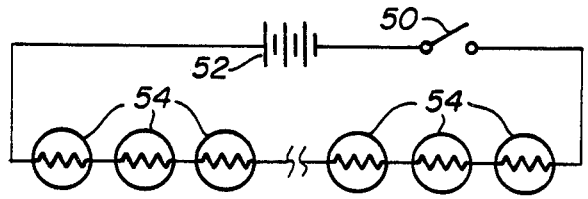
FIG. 5 is a schematic representation of a power supply coupled to series connected heating elements to heat the material which is invisible to form a visible scene.

While the instant invention is applicable to a wide variety of works such as books, pamphlets, games, greeting cards and the like on which it is desired to have words and/or pictorial material visually depicted and/or the words of songs sung, and/or simulated vocal sounds projected, it will be described in connection with books.

FIG. 1 is a diagrammatic representation of a work of the present invention such as a book, the book being generally designated by the numeral 10 and having an upper page or cover 12 and at least one or more lower pages 14.

FIG. 2 illustrates the book of FIG. 1 in its open position showing the left side of the book having writing 16 or text thereon and on the right side 14 a first scene including mountains 17, a cave entrance 18 in mountains 17 and a tree 20. The scene, of course, could be of any type and, as shown, is illustrative only and is presented for discussion of the manner in which the novel invention functions and is not intended to be limiting in scope.

Power supply 22, which may be any power supply and preferably a portable power supply such as a battery or a solar cell, is coupled through connections 24 to a control circuit 26 which produces an output on line 28 that is coupled to a visual image display means such as either a liquid crystal or an electrochromic display forming at least a portion of a visual image. As shown the display is of both the cave entrance 18 and tree 20 and which circuit 26 produces an output on line 29 that is coupled to a speech synthesizer 31 whose output is coupled to a sound producing means 21 such as a speaker or sound disc. Further, a switch 30, such as a capacitive touch switch or any other miniature switch which can be operated manually, is shown having an output on connection 32 coupled to control circuit 26 which can force a current to be produced on line 28 coupled to the displays forming at least a portion of both cave entrance 18 and tree 20 to cause a scene to change. The cave entrance 18 may, for example, be empty when the book is first opened. In addition, the tree 20 may be barren except for leaves.

Referring now to FIG. 3A, it can be seen that upon opening of the book, the power supply 22 will produce a voltage which is coupled by the circuits described earlier in relation to FIG. 2 to the displays forming at least a portion of cave 18 and to the tree 20. It will now be noted that the displays now form a second scene that is interposed with the first scene including a FIG. 34 which has appeared in the entrance of cave 18, apples 36 which have appeared on tree 20 and/or the figure of an animal 38 which has appeared underneath tree 20. This is caused, as explained earlier, by either a voltage produced by power supply 22 being coupled to a photochromic material or a liquid crystal display or heat generated by the current produced by power supply 22 and applied to a liquid crystal material.

As indicated earlier, when the FIG. 34 appears in cave 18, the speech synthesizer circuit 31 will cause speaker 21 to utter a phrase or words related to the figure such as, for example only, "cave man" as indicated at 35. In like manner, when the apples appear on the tree, the synthesizer 31 may cause speaker 21 to utter the word "apples" as indicated at 37. Similarly, when the FIG. 38 appears beneath the tree, the speech synthesizer 31 may cause speaker 21 to utter the word "cat" as indicated at 39.

Should the child or user of the book wish to view a different scene, a finger is merely placed in contact with a switch such as capacitive touch switch 30 which causes the control circuit to reverse the voltage polarity or to remove the heat to change the second scene shown in FIG. 3A causing it to go blank and, if desired, causing a third scene to appear as shown in FIG. 3B. There it can be seen that the figure or individual 34 has stepped out of the mouth of cave 18, at least part of the apples 36 have fallen from the tree and now lie on the ground, and the animal 38 is now moving across the page in a sequence of pictures 40, 42, and 44. When the book is closed and power is removed from the circuit, the scenes revert to the first scene as shown originally in FIG. 2 where the cave mouth is empty and the tree has no fruit on it. When the book is opened again, the second scene will appear again as shown in FIG. 3A and the third scene may be caused to appear again by depressing or placing the finger in contact with capacitive touch switch 30.

In like manner, the speech synthesizer 31 may cause the speaker 21 to utter some words related to the figure or the animal or the apples such as, for example only, as related to the animal, "see the cat run" as indicated at 41, "what does a cat say" as indicated at 43, and/or "meow" as indicated at 45. Further, if desired, a display 47 may be placed on the page of the book and the letters CAT, for example only, may spell out the name of the animal as the voice spells the letters in conjunction with the letters appearing. Thus, when C appears the voice from speaker 21 states "C". When the A appears the voice states "A". When the T appears the voice states "T" and then the voice may state the name "CAT".

Figure 11:
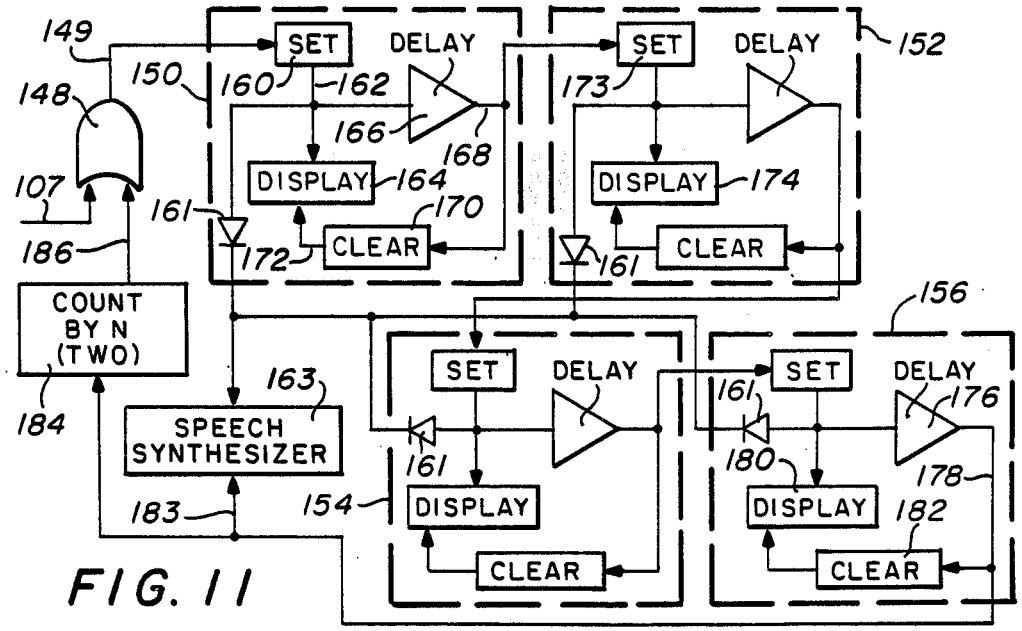
FIG. 11 is a schematic representation of a circuit necessary to cause an object such as an animal to move across the page in a sequence of pictures and/or to cause a sequence of sounds.

If desired, the book 10 shown in FIG. 2 could be a greeting card 318 as shown in FIG. 15 having the solar cell 322 powering displays 328 which may be, for instance, a single or multiple LCD or electrochromic displays. In that instance, the act of opening of the card 318 would allow the solar cell to produce power to the display 328 which could then provide a textual or other visual and oral message or pictorial display to the person opening the card. The message would be preprogrammed into a semiconductor chip in a well known manner with an appropriate delay line 166 as shown in FIG. 11 to cause a small delay after the card is opened before the message appears. Further, if it is desired, the circuit can cause the textual message to appear one letter at a time. In that case, the circuit shown in FIG. 16 could be used as will be explained hereafter or the circuit shown in FIG. 11 could be used with the exception that there would be no CLEAR circuits 170. Thus, the first SET circuit 160 would cause the first letter of the message to be printed at display 164 in FIG. 11 and after an appropriate delay caused by delay circuit 166, the next SET circuit 173 could cause the next letter of the textual message to appear and so forth until the entire textual message has been printed. In this case, the display need not be in colors other than black and white and thus a liquid crystal without other colors than black and white could be used. Obviously, the electrochromic material or heat sensitive liquid crystal providing colored letters in addition to black and white could also be used if desired. Moreover, at any next SET circuit an oral message or another appropriate vocal sound such as that of a kiss could be generated.

FIG. 4A is a cross sectional view of the power supply 22 shown in FIG. 2 and is comprised of a solar cell 22 that is mounted in the page 14 when it is formed. The solar cell 22 will, of course, only produce a voltage when it receives light. In this case, when the book 10 is opened to the page shown in FIG. 2, FIG. 3A or FIG. 3B, light striking photocell 22 will cause a voltage to be produced which will generate the first scene shown in FIG. 3A.

FIG. 4B is a cross sectional view of an alternate form of a power supply as shown in FIG. 1 which is a battery 46 mounted in page 14 and held in place by a cover 48. In addition, a switch 50 may be formed in the page 14 of the book in any well known manner to connect the battery 46 to the circuit when the book is opened and disconnect the battery 46 from the circuits when the pages are closed. As will be explained hereafter in relation to FIG. 13, this switch may be a phototransistor in the ground circuit of the power supply to enable the power supply only when the page is turned and light strikes the phototransistor.

FIG. 5 is a circuit diagram illustrating how the LCD elements, which are affected by and change colors other than black and white under the influence of heat, are energized. As is well known in the art, the exact amount of heat generated by each resistive heating element 54 can be calculated by the formula $P=I_2R$ where P=power generated in watts, I=current in amperes and R=resistance of element 54 in ohms. Thus in FIG. 5, power supply 52, which may be either the battery 46 in FIG. 4B or the solar cell 22 in FIG. 4A, energizes heating elements 54 which are shown in series to cause a temperature rise at each of the element 54 locations thus causing the LCD associated with each of the heating elements 54 to change its state from one color to another as explained previously. Thus, if the elements 54 represented the apples on tree 20 in FIG. 3A, when the heat is applied to the LCD's representing the apples, the apples become visible because of the heat and the scene changes from scene 1 shown in FIG. 2 to the scene shown in FIG. 3A with the apples on the tree. In like manner, if a heating element 54 were associated with the entrance of cave 18, it could cause the FIG. 34 to appear in the mouth of the cave as shown in FIG. 3A. Switch 50 is shown in FIG. 5 to represent a switch which is opened and closed by the turning of the page in the event that power supply 52 is a battery 52. This switch could be any known electrical switching device such as a mechanical switch that is spring loaded or could be the phototransistor 232 in FIG. 13. When the power supply is a solar cell, no switch 50 is required. When the power is removed and the elements 54 cool, the second scene disappears.

Figure 6:
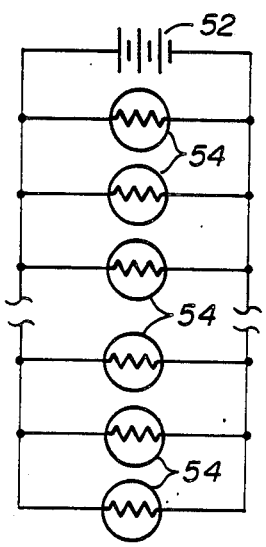
FIG. 6 is a schematic representation of the heating elements for the scene to be made visible coupled in parallel to the power supply.

FIG. 6 is identical to FIG. 5 except in this case the switch 50 is not shown and the heating elements are connected in parallel rather than in series. However, the circuit functions otherwise in exactly the same way as described earlier with respect to FIG. 5.

Figure 7:
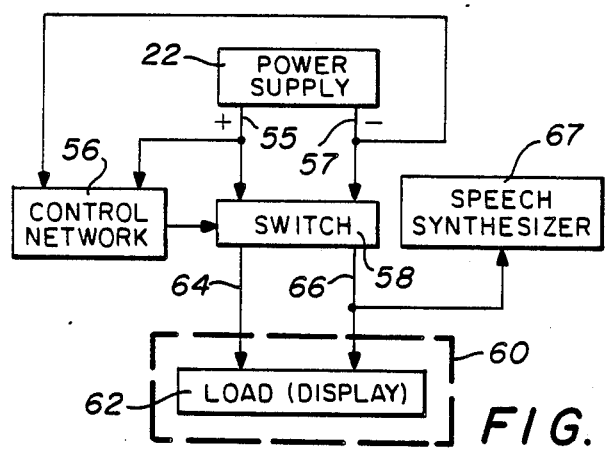
FIG. 7 is a diagrammatic representation of a circuit coupling the power supply to the visual display to cause it to appear or disappear and to the speech synthesizer.

FIG. 7 illustrates the basic electrical block diagram for control of the novel system. Power supply 22, which may be either a solar cell or a battery, supplies output voltage on lines 55 and 57 which are coupled to control network 56 and switch 58. The switch 58 first applies a first polarity voltage on lines 55 and 57 to the load 60 on respective lines 64 and 66. This voltage serves to cause the display 62, which may be the individual figure in cave 18 in FIGS. 3A or 3B or the apples 36 on tree 20 or on the ground or animal 38, to be in the nonvisible state. After the display has been forced to its nonvisible state, control network 56 then causes switch 58 to reverse the voltage polarity applied to load 60 or display 62 which then causes the display to become visible as discussed earlier thus causing the individual 34 to appear in cave 18 or apples 36 to appear on tree 20 or to be on the ground underneath the tree or the animal 38 to appear. It further activates speech synthesizer 67 to cause the proper voice to appear in conjunction with the activated display 62.

Figure 8:
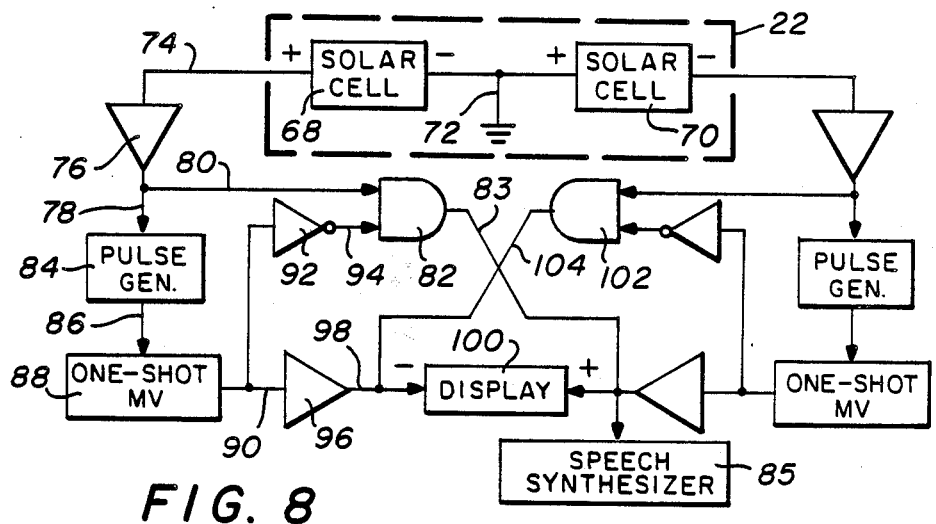
FIG. 8 is a detailed circuit drawing of the schematic representation shown in FIG. 7.

FIG. 8 is a detailed schematic diagram of the circuitry shown in block diagram in FIG. 7. Thus as shown in FIG. 8, power supply 22 may be comprised of solar cells 68 and 70 (or batteries) with a center tapped ground connection 72. Since the output of each of the solar cells is fed through an identical circuit, only one of the circuits will be described in detail. The output of solar cell 68 is coupled on line 74 to an amplifier 76. When the book is first opened, the solar cells begin to produce a voltage output. This voltage is coupled to amplifier 76 which at some point in the rise of the voltage will produce an output on lines 78 and 80. The signal or voltage on line 80 is coupled to an AND gate 82 as one input. The output of the amplifier 76 on line 78 is coupled to a pulse generator 84 that produces a voltage spike output on line 86 to one-shot multivibrator 88. As is well known in the art, one-shot multivibrator 88, when it receives the pulse on line 86, will temporarily change states thus producing an output on line 90 so long as one-shot multivibrator 88 stays in its switched position. During that period of time, the inverter 92, which has the signal on line 90 as an input, has no output on line 94 thus disabling AND gate 82. However, the output signal from one-shot multivibrator 88 on line 90 is also coupled to amplifier 96 which produces a positive polarity output on line 98 to display 100. Since the output from solar cell 70 has gone through exactly the same procedure in a similar circuit except to produce a negative polarity voltage, a voltage of polarity from plus to minus is applied across display 100 thus forcing it into the invisible state.

However, after the output of one-shot multivibrator 88 on line 90 decays, no signal is present on line 90 and thus amplifier 96 fails to provide the positive polarity input on line 98 to display 100. Inverter 92 now produces an output on line 94 enabling AND gate 82 which causes a positive voltage to now be coupled on line 83 to the other side of the display and in a similar manner the output of AND gate 102 causes the negative voltage on line 104 to be applied to the opposite side of display 100 thus causing the text or pictorial display to appear as described earlier. Further, speech synthesizer 80 is activated in conjunction with the display 100. It will be obvious from the description of the circuitry that when the book 10 is closed that the solar cells will no longer receive light and will no longer produce a voltage output and the circuit will become inoperative. However, as soon as the book is opened again and the solar cells again produce voltage, the circuitry will operate as described previously to drive the display to the nonvisible condition so long as one-shot multivibrator produces a pulse on line 90 and then will revert to the visible state causing the picture or scene and the associated voice to again appear. The circuitry may be constructed of MOS/LSI circuits which are low power, large scale integrated circuits using metal oxide semiconductor devices.

Figure 9:
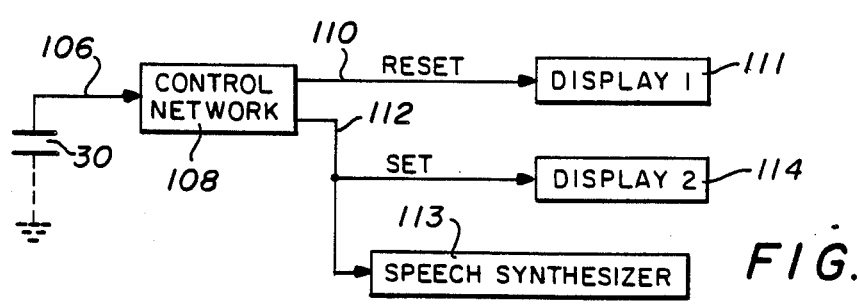
FIG. 9 is a schematic representation of a circuit for changing the scene and/or producing a voice by touching a capacitive switch located on a page of the work.

FIG. 9 illustrates the manner in which the second scene can be made invisible and a third scene made to appear as for example the apples in FIG. 3B dropping from tree 20 onto the ground. In that case, the capacitive touch switch 30 in FIG. 9, and as shown in FIGS. 2, 3A and 3B, will be activated when the user of the book places a finger in proximity to switch 30. An output will be produced on line 106 to a control network 108 which resets the first display 111 representing the second scene to the nonvisible condition by a signal on line 110 and produces a signal on line 112 to set the second display 114 representing the third scene to the visible condition. Also the voice circuit 113 is simultaneously activated. Thus, for example, when the book is first opened, there are no apples 36 on tree 20 (the first scene shown in FIG. 2), but after a short period of time apples 36 appear on the tree and the voice may say "apples" and/or an animal 38 may appear and the voice may say "cat" (the second scene shown in FIG. 3A). Then if the user places a finger in proximity with capacitive touch switch 30, the apples 36 disappear from tree 20 and appear on the ground under the tree or the animal 38 may appear to run (the third scene shown in FIG. 3B). The voice circuit 113 may then say "see the apples fall" or "see the cat run".

Figure 10:
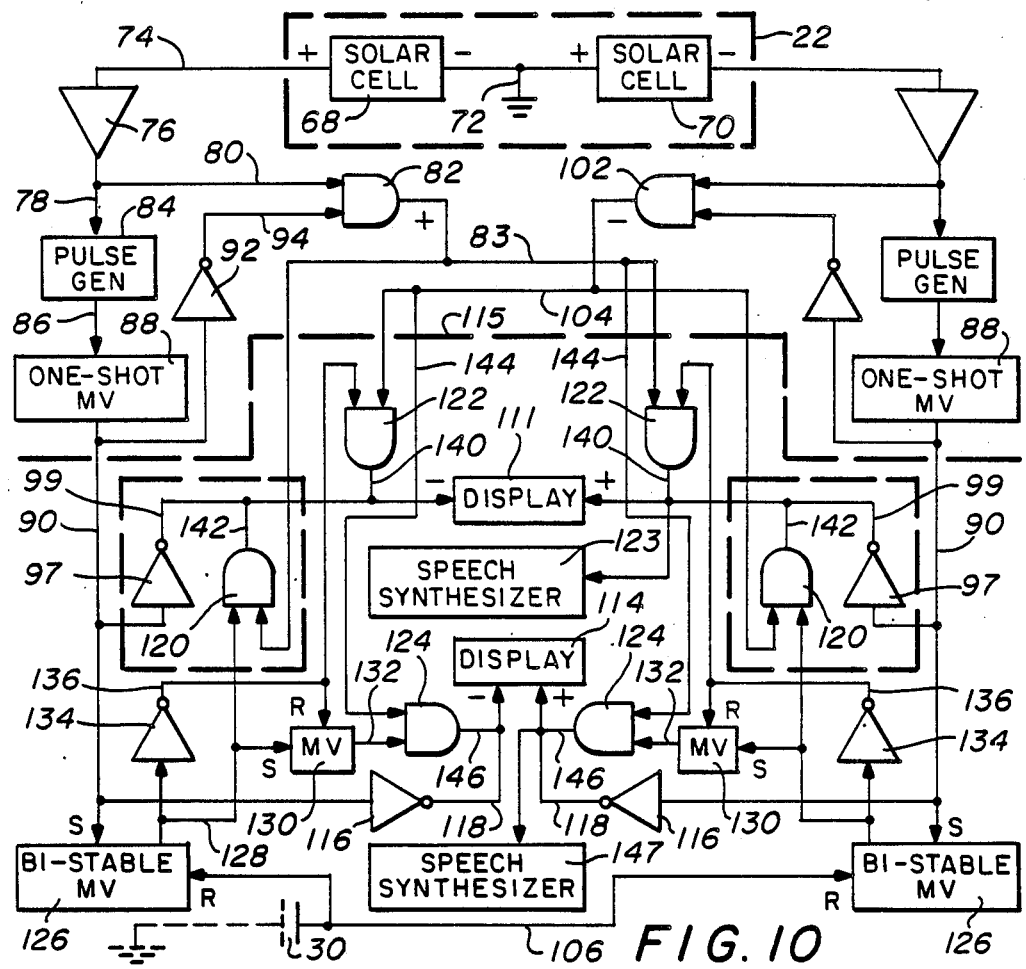
FIG. 10 is a detailed circuit diagram of the basic circuit shown in FIG. 9 to cause a change of the display and/or the speech by touching a capacitive switch on a page of the work.

The details of the circuitry shown in FIG. 9 are disclosed in FIG. 10. In FIG. 10 the circuitry above dashed line 116 operates in the manner previously discussed in relation to FIG. 8 to initially clear displays 111 and 114 and then to reverse the voltage to display 111 causing the second scene to appear. Thus, the output from one-shot multivibrator 88 on line 90 is coupled to amplifier 97 that produces the outupt on line 99 to drive display 111 to the nonvisible condition or state. At the same time, that signal on line 90 is also coupled to amplifier 116 which produces an output on line 118 to reset or drive display 114 to the nonvisible state. However, as soon as the output from one-shot multivibrator 88 on line 90 disappears, as described previously, AND gate 82 produces an output on line 83 to AND gates 120, 122 and 124. At that time bi-stable multivibrator 126 has been SET by the pulse on line 90 from one-shot multivibrator 88 and it produces no output signal on line 128. This causes AND gate 120 to be disabled and it produces no output on line 142. Also, in like manner AND gate 122 from the other circuit is also disabled so that it produces no output. Further, since bi-stable multivibrator 126 has been SET and no output appears on line 128, bi-stable multivibrator 130 stays in its SET state with no output on line 132 and thus AND gate 124 is also disabled. At this point, both displays 111 and 114 have had voltage applied to them with a polarity to force them to the nonvisible state.

However, because bi-stable multivibrator 126 is not producing an output on line 128, inverter 134 will produce an output on line 136 thus enabling AND gate 122 and causing the negative voltage output from AND gate 102 to be applied on line 104 to AND gate 122 which will produce a negative voltage output on line 140 to display 111. In like manner, of course, AND gate 122 on the negative side of the circuit will be enabled thus applying the positive voltage from AND gate 82 on line 83 to the display 111 thus driving it to the visible state to form the second scene shown in FIG. 3A. Speech synthesizer 123 may then be activated to produce a voice associated with the second scene such as the word "apples".

In the event that the user or child should desire to cause the FIG. 34 in cave entrance 18 to move out of the cave or the apples 36 to fall from tree 20 or the animal 38 to move as shown in FIG. 3B, they place a finger in proximity to capacitive touch switch 30 which produces an output on line 106 which resets bi-stable multivibrator 126. At this point in time an output is produced on line 128 from bi-stable multivibrator 126 which is coupled to AND gate 120 and enables it. At the same time, however, inverter 134 removes the output on line 136 which disables AND gate 122 and removes the negative voltage output from AND gate 122 on line 140. However, AND gate 120 now produces a positive voltage output on line 142 and the display 111 is again driven to the nonvisible state.

At the same time, however, the output signal on line 128 from multivibrator 126 is coupled to multivibrator 130 which is caused to produce an enabling signal on line 132 to AND gate 124. The other input to AND gate 124 on line 144 is the negative voltage from AND gate 102 which enables AND gate 124 to produce a negative voltage signal on output line 146 thus enabling or driving display 114 to the visible state and activating voice circuit 147. Since display 111 represented the individual or FIG. 34 in the cave, apples 36 on the tree, or animal 38 this means that the FIG. 34 is now made invisible in the cave entrance and the apples 36 on the tree and animal 38 are made invisible by driving display 111 in the reverse direction. However, since display 114 represents individual or FIG. 34 out of the cave as shown in FIG. 3B and the apples 36 on the ground and the animal 38 moving as in FIG. 3B, these are represented by display 114 which has been driven in such a direction as to cause those figures to become visible. The voice may then appropriately add words relating to the scene such as "see the cat run".

Thus, it can be seen that the novel invention provides for a first scene as shown in FIG. 2 which is fixed, a second scene as shown in FIG. 3A interposed with the first scene whereby certain portions are caused to appear and a third scene is caused to appear and the second scene disappear as shown in FIG. 3B. A voice may be associated with each scene. This is accomplished by the circuit shown in detail in FIG. 10.

FIG. 11 discloses the basic block diagram of a circuit which can be utilized to cause, for example only, an animal 38 shown in FIG. 3A to move across the page as illustrated by the dashed FIGS. 40, 42 and 44 in FIG. 3B by activating capacitive touch switch 30. In that case, the output signal generated by capacitive touch switch 30 on line 107 is coupled to OR gate 148 which produces an output on line 149 to a circuit 150 which is identical to the circuits 152, 154 and 156 which follow thereafter. Obviously, more than four circuits could be coupled in series as shown but only four such circuits are shown here for purposes of clarity of description and ease of illustration. As the signal on line 106 is coupled to OR gate 148, an output is produced on line 149 which is coupled to SET circuit 160 which produces an output on line 162 to set display 164 to the visible state. The output on line 162 is also coupled through a delay circuit 166 which produces a delayed output on line 168 which is coupled to CLEAR circuit 170 that produces an output on line 172 and returns display 164 to its nonvisible state as described previously.

However, that same output on line 168 from delay circuit 166 is coupled to the next SET circuit 172 where the process of setting display 174 and clearing it is repeated. Each of the circuits 150, 152, 154 and 156 operate as disclosed with respect to circuit 150 and therefore will not be described in any further detail. Suffice it to say that when the delay line 176 in the last circuit 156 produces an output on line 178 to clear display 180 through CLEAR circuit 182, that same signal on line 178 is coupled to a count-by-n circuit 184 which checks to see if the circuit has gone through n iterations (for example two iterations). If not, it produces an output on line 186 which is coupled back to OR gate 148 and allows the sequence to start again. After the nth time around the count-by-n circuit 184 which, for example, may count n=two, does not produce an output on line 186 and the circuits all remain in the CLEAR state or invisible state.

Thus, the successive setting and clearing of the particular displays causes the animal 38 to successively appear and disappear and gives the impression as shown in FIG. 2B that the animal or other object is moving across the page. The speed at which it will move depends upon the delay time of the delay circuits such as 166 and 176.

Obviously, the details of the SET circuits 160 and the CLEAR circuits 170 need not be disclosed in detail since they would operate in a manner similar to or on the same principles as that disclosed in relation to FIG. 10 or in any other well known manner to cause each display to successively appear and then disappear in sequence to cause the appearance of movement of the object across the page of the book.

This circuit may also be used to spell a sentence, phrase or word letter by letter with the voice circuit sounding each letter as it appears. If the word spelled is CAT, when the signal on line 162 causes display 164 to print "C", voice circuit 164 audibly states "C". The same operation occurs with the outputs from the other circuits where shown in FIG. 11. When the last letter is printed, the signal on line 183 may cause the voice circuit 163 to sound the word such as, for example, "CAT".

FIG. 12 is a circuit diagram of an alternate embodiment of a circuit which could be used to cause a display to go from the invisible to the visible state. In this case, solar cells 190 and 192 provide the power source. They are center tapped by ground circuit 194 and the output of solar cell 192 on line 196 is coupled to PNP transistor 198 while the output of solar cell 190 on line 200 is coupled to NPN transistor 202. The output of solar cell 192 is also coupled on line 204 to one-shot multivibrator 206. When the voltage output on line 204 reaches a sufficient level, the output of one-shot multivibrator 206 on line 208 is coupled to the base 210 of NPN transistor 202 thus turning transistor 202 on and allowing the negative voltage from solar cell 200 to pass through the emitter and collector of transistor 202 to the display 212 on line 214. Resistor 216 serves as the return ground path. Thus, a voltage from negative to ground is applied across the display 212 thus driving it to the invisible condition.

At the same time, the output of one-shot multivibrator 206 on line 208 is coupled to an inverter 218 which, during the time a signal is present on line 208 from one-shot multivibrator 206, does not have an output on line 220 and thus AND gate 222 is disabled. However, when the pulse from one-shot multivibrator 206 on line 208 collapses, inverter 218 produces an output on line 220 which enables AND gate 222 thus coupling the negative voltage on line 200 from solar cell 190 to the speech synthesizer 223 to activate it and to the base 224 of PNP transistor 198 thus turning it on. This allows the positive voltage from solar cell 192 on line 196 to pass through the emitter and collector of transistor 198 on line 214 to display 212 thus applying a positive to ground voltage across display 212 and driving it to the visible state as well as activating the voice circuit 223. It will be understood that when the light is removed from the solar cells 190 and 192 as, for instance, by closing a page of a book, the power is removed from the circuit and the circuit is then ready to operate again as previously described when light is again allowed to strike the solar cells 190 and 192 when the book is again opened.

FIG. 13 is a circuit diagram of a portion of a circuit which can be used if batteries replace solar cells 190 and 192 in FIG. 12. Thus, in FIG. 13, batteries 226 and 228 are coupled together at their opposite polarity terminals by line 230 and a phototransistor 232 is coupled between line 230 and ground 234. The output of the batteries 226 and 228 on lines 236 and 238 respectively would be coupled to the circuit in FIG. 12 as if they were the outputs of the solar cells 190 and 192. It can be seen that when no light strikes phototransistor 232, it is an open circuit thus preventing any current flow from the batteries through the ground circuit shown in FIG. 12 back to the batteries thus preventing any drain on batteries 226 and 228 until light is allowed to strike the phototransistor 232 as, for instance, by turning a page of a book. When light strikes the phototransistor 232, it conducts and thus couples the ground 234 to the center tap of batteries 226 and 228 thus completing the circuit for all of the ground paths shown in FIG. 12 and enabling the circuit to operate in a manner as described previously.

FIG. 14 is an alternate embodiment of a circuit which can be used to control two displays and two speech synthesizers wherein the first display and voice and the second display and voice are driven to the invisible and silent state and then the first display and voice is driven to the visible and audible state. At any later time as desired a touch switch can be operated and the first display and voice is driven again to the invisible and silent state while the second display is driven to the visible and audible state.

The circuit operates as follows. Again the power sources 240 and 242 may be either solar cells or batteries as desired. Their opposite output polarities are center tapped at 244 and coupled to ground 246. In addition, the output of power supply 240 on line 248 is coupled to the collectors of NPN transistors 250 and 252 as well as to AND gates 254 and 256. In like manner, the positive output voltage on line 258 from power supply 242 is coupled to the emitters of PNP transistors 260 and 262 as well as to one-shot vibrator 264, AND gate 266, and AND gate 268.

When the power supplies are allowed to energize either by allowing light to strike them if they are photo cells or through a circuit such as in FIG. 13 if batteries are used, both power supplies produce output voltages. Power supply 240 produces a negative voltage on line 248 and power supply 242 produces a positive voltage on line 258. At that point, one-shot multivibrator 264 produces an output on line 270 which is coupled to a bi-stable multivibrator 272 through connection 274, inverter 276 and the base 278 of transistor 250. This signal causes transistor 250 to conduct thus coupling the negative supply voltage on line 248 through the emitter and collector of transistor 250 to one side of display 280 thus driving display 280 to the invisible state by applying a voltage to it which is negative with respect to ground potential. At the same time, the output of one-shot multivibrator 264 on line 274 causes bi-stable multivibrator 272 to SET and it produces an output on line 282 which is coupled to AND gate 284 and AND gate 268 as an enabling signal. However, AND gate 284, which is coupled to base 286 of transistor 260, does not have the other enabling signal coupled into it and thus it is disabled at that moment. However, AND gate 268 is enabled because of the positive voltage appearing on line 288 and thus AND gate 268 produces an output on line 290 which is coupled to the base 292 of transistor 252 thus causing it to conduct and the negative voltage on line 248 flows through the emitter and collector of transistor 252 on line 294 to display 295 thus driving it also to the invisible state.

When the pulse from one-shot multivibrator 264 decays, transistor 250 is disabled and stops conducting. At the same time, inverter 276 now produces an output on line 296 which enables AND gate 254 to conduct and cause a negative voltage on line 298 to be coupled as the other enabling input to AND gate 284. AND gate 284 now produces an output on line 300 which is coupled to the base 286 of transistor 260 thus turning this transistor on and causing it to conduct. When transistor 260 conducts, it couples the positive voltage on line 258 through its emitter and collector and produces an output on line 302 to display 280 thus placing a positive to ground voltage across the display and driving it to the visible state as well as activating voice circuit 279.

When it is desired to change the scenes from the first display 280 to the second display 295, the user merely places his finger in proximity to capacitive touch switch 304 which produces an output signal on line 306 to multivibrator 272 thus resetting it and removing the output on line 282 and causing an output to be produced on line 308. With the signal removed from line 282, AND gate 268 is disabled and transistor 252 ceases to conduct thus removing the negative to ground voltage across second display 295. At the same time the enable signal on line 282 is removed from AND gate 284 thus causing transistor 260 to cease conduction and removing the positive to negative voltage across first display 280. Simultaneously, AND gate 266 is now enabled with the signal on line 308 thus producing an output to the base 278 of transistor 250 thus causing it to conduct once again and it couples the negative voltage on line 248 across display 280 to ground thus driving that display to the invisible state once again.

At the same time, the output of bi-stable multivibrator 272 on line 308 is coupled through line 310 to AND gate 256 to enable it and it produces a negative voltage on output line 312 to the base 314 of transistor 262 thus causing it to conduct. It therefore conducts the positive voltage on line 258 through its emitter and collector on line 316 to second display 295 thus driving it to the visible state and enabling voice circuit 317. Thus, as can be seen, this circuit provides an alternate means for controlling two displays and causing each one to be able to go reversibly from the visible to the invisible state and to activate the appropriate voice circuit 279 or 317 when display 280 or 295 is activated and the scene made visible.

FIG. 15 is an alternate embodiment of an activated work which can be utilized by this invention. In FIG. 15, a work such as a greeting card 318 is illustrated having some writing or pictures depicted at 320 on one of the inside sheets and having on the other sheet and embedded therein a power supply 322 with a phototransistor 324 in its ground path as illustrated previously with respect to FIG. 13. Thus, when the greeting card 318 is opened and light strikes the phototransistor 324, it activates power supply 322 which is coupled to a control circuit 326 which drives a display formed of sequential segments 328 to cause letters of a message to appear. This may be done either simultaneously or sequentially. Thus, if simultaneously, the words "I love you" could appear for example. At the same time a voice circuit 327 is activated to cause speaker 329 to state "I love you". In like manner if it is desired that the same message appear one letter at a time, the message would begin with the letter I, followed by the letter L, O and so forth until the message has been spelled out. Again, voice circuit 327 would cause the letters to be individually spoken as they appear. Obviously, this is an example only and many other types of messages could be displayed either having segments of the message caused to appear sequentially or having the entire message or pictorial representation or depiction appear instantaneously with a corresponding voice pattern.

FIG. 16 illustrates a circuit which could be used to activate or operate the novel card shown in FIG. 15 wherein the message letters and accompanying voice would appear sequentially. The display 330 is comprised of either a single display or a number of individual segments 332, 334, 336 and 338. It will, of course, be realized that the number of segments that are desired to be used could be any number When the card or activated work is first opened or exposed to light, power supply 340 produces outputs to enable clock 342 and reset circuit 344, Reset circuit 344 produces an output on line 346 which is coupled to both counter 352 and flip flops 354 to clear them. One flip flop 354 is provided for each of the display segments 332 through 338. When the counter 352 is cleared it has an output produced on line 356 to indicate that it is in the clear state. Also, the flip flops 354 are all reset or cleared such that an output is produced on line 358 and coupled to an inverter 360 which produces the proper output polarity on line 362 to drive segment 338, for instance, to the invisible state. That output signal from inverter 360 is also coupled on line 364 to AND gate 366. There it enables AND gate 366 to produce an output on line 368 which is a clock enable signal coupled to counter 352 through AND gate 380. The clock 342 is running all the time and producing clock pulses on line 370 to counter 352. However, counter 352 will not operate until the enable signal appears on line 368. At that time the counter 352 begins to count and the first count removes the signal on line 356 to AND gate 366 thus removing the clock enable signal to the counter 352. However, before the clock enable pulse on line 368 is removed, it is also coupled to flip flop 372 to clear it, and no output is produced on line 374 from flip flop 372. This causes inverter 376 to produce an output on line 378 which is coupled through AND gate 380 as the clock enable signal to counter 352 enabling it to continue to count after the signal on line 368 is removed. When the counter 352 reaches the end of its count and all of the flip flops 354 have been set, the counter 352 returns to its initial state thus again producing an output on line 356. However, the inverter 360 now does not have an output on line 364 and thus AND gate 366 is not enabled and no clock enable appears on line 368. In addition, the signal on line 356 from counter 352 is coupled to flip flop 372 to SET it thus producing an output on line 374 which removes the output from inverter 376 and killing the clock enable signal on line 378 to AND gate 380 and removing the clock enable signal to counter 352. Thus the counting stops and the message is visible on the individual segments of display 330 because flip flops 354 have been individually set. Speech circuit 339 was also activated as each display segment was activated and thus each letter was sounded as it appeared. As indicated earlier these segments may be individual letters of a message. Also, they may be individual depictions of some type as, for instance, a picture. The display 330 is intended to include any type that can be constructed with the liquid crystal displays and photochromic displays encompassed herein.

When the card is closed and the power supply is disabled, the entire circuitry then is ready to be driven to its reset state by reset circuit 344 whenever the card is opened once again and the message repeats itself. It will be understood that in the reset state the flip flops 354 are all driven such as to clear the elements of display 330. It is when the counter begins to count that each of the flip flops are set and cause an output through the inverters 360 which drive each individual segment to its visible state.

FIG. 17 is a circuit diagram of a capacitive touch switch which can be of MOS/LSI construction and which can be used as the switch 304 in FIG. 14. Here inverter 382 is coupled between a resistor 384 and a capacitive switch 386. The voltage from source 388 is coupled through resistor 384 to the input of inverter 382. With a high voltage applied to inverter 382, no output signal appears on line 390. However, when an individual touches area 386 with a finger, the body causes a resistance 392 to ground 394. This resistance 392 is small compared to resistor 384 and is represented by dashed lines. Because most of the voltage is now dropped across resistance 384 because of the voltage divider ratio between resistor 384 and the body 392, a low voltage appears at the base of inverter 382 and an output signal appears on line 390 which, of course, is the signal which is used as explained previously in FIG. 14 to disable first display 280 and drive it to the invisible state and to enable second display 295 and drive it to the visible state. The inverter 282 may be of the type manufactured by National Semiconductor Corporation and known as MM54C04. These are the same type of inverters that may be used in any of the other circuits herein such as those in FIG. 16 and designated as inverters 360 and 376.

FIG. 18 is a schematic representation of a clock circuit which can be used as clock 342 in FIG. 16. As can be seen in FIG. 18, inverters 396, 398 and 400 are coupled in series to an output terminal 402. In like manner, the input to inverter 396 and the output of inverter 400 are coupled together through series connected resistors 404 and 406. A capacitor 408 couples the output of inverter 398 to the junction of resistors 404 and 406. As is well known in the art, the frequency of the output pulses from this clock will depend upon the values of capacitor 408 and resistors 404 and 406. Again, the inverters 396, 398 and 400 may be of the type previously designated as MM54C04 and may be of MOS/LSI construction.

FIG. 19 is a circuit diagram of the reset circuit 344 shown in FIG. 16 and is in effect a monostable multivibrator. Thus, when the power supply first begins to produce a voltage, that voltage is coupled to terminal 408 which passes through capacitor 416 to the base 418 of general purpose field effect transistor (FET) 420 which produces signals to the input of operational amplifier 412 which provides a reset signal from output line 414. However, when capacitor 416 is sufficiently charged, it removes the voltage from the base of FET transistor 420 which causes the output or reset signal from the output of operational amplifier 412 to be removed. Thus, when the power supply first comes on a reset pulse is produced which is used as described previously with reference to FIG. 16 to reset the counters and the flip flops or bi-stable multivibrators 354. The operational amplifier 412 may be of the type well known in the art and designated as CM3900. The general purpose FET 420 may also be of any well known general purpose type. The size of capacitor 416 and resistor 420 will create a time constant which will determine how long the reset pulse will appear on line 414.

FIG. 20 discloses the schematic representation of a bi-stable multivibrator or flip flop such as those which are designated in FIG. 16 as flip flops 354 and 372. As can be seen in FIG. 20, flip flop 424 has a voltage input on line 426, a set pulse on line 428, a clear pulse on line 430 and an output signal on line 432. Obviously, in one state the output on line 432 would be a signal which may be designated as Q and in the other state would have no signal which would be designated as $\bar{Q}$. Thus, when the flip flop 424 has a set pulse applied to it a signal or Q signal will appear on line 432 whereas when the clear pulse is applied to line 430, no signal or the $\bar{Q}$ signal will appear on line 432. This type of flip flop is also well known in the art and is designated as the National Semiconductor Corporation flip flop MM54C74.

The circuits used herein may be monolithic MOS integrated circuits and general purpose FET transistors may also be used. These circuits consume low power and can be very densely packed in a tiny space thus meeting the conditions required for use in an activated work such as a child's book or greeting card.

Thus, there has been disclosed a novel book and in particular a child's book having at least one colored picture of a scene to be viewed, a second scene interposed with the first scene and being essentially invisible in a first deactivated state and visible in a second activated state and an electrical source for selectively and reversibly changing the second scene from the invisible to the visible state and to generate an appropriate voice with each visible state of a scene. The invention also contemplates a third scene interposed with said first scene and being essentially invisible in a first state and visible in a second state with means for deactivating or making the second scene invisible and the third scene visible along with an audible, appropriate voice message.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

We claim:
1. An activated work comprising:
   a. at least two turntable pages pivotably attached at one edge of said pages so that said pages are pivotable from a juxtaposed closed position to an adjacent opened position;
   b. a visual image display means having areas thereof with variable electromagnetic radiation absorption characteristics affixed to one of said pages, said visual image display having a first visual activation state at which a visual image is essentially not visible and a second visual activation state at which said visual image is visible;
   c. a sound generating means attached to said work having a first activation state at which an audible sound is not generated and a second activation state at which an audible sound is generated;
   d. means connected to said visual display for selectively activating said visual display means from one of said visual activation states to another upon pivoting said pages from said closed position to said open position or from said open position to said closed position; and e. means connected to said sound generating means for selectively activating said sound generating means from one of said sound activation states to another upon pivoting said pages from said closed position to said opened position or from said opened position to said closed position.

2. A work as in claim 1 further including:
a. a power source forming said means for selectively activating said sound generating means, and
b. means for energizing said power source whenever the preceding page is turned to its open position and de-energizing said power source whenever the preceding page is returned to its closed position.

3. A work as in claim 1 further including:
a. a single power source forming said means for selectively activating said visual display and said means for selectively activating said sound generating means, and
b. means for energizing said single power source whenever said pages are opened and de-energizing said single power source whenever said pages are closed.

4. A work as in claim 3 wherein:
a. said power source comprises a battery and an electrical coupling circuit between said battery and said visual display means and between said battery and said sound generating means, and
b. said means for energizing said power source comprises an electrical switch interposed in said electrical coupling circuit and operated by opening and closing said pages.

5. A work as in claim 3 wherein said power source and said means for energizing said power source comprises a photovoltaic material coupled to said visual display means and said sound generating means so that a voltage is generated when said pages are opened and said photovoltaic material is exposed to light 6. A work as in claims 4 or 5 wherein said work is a greeting card.

7. A work as in claim 1 wherein:
a. said second visual activation state comprises a series of sequentially occurring letters to form at least one word of a message, and
b. said second sound activation state comprises producing sounds representing each letter in conjunction with its visual appearance.

8. A work as in claim 1 wherein:
a. said second visual activation state comprises a visual series of sequentially occurring scenes each having at least one visible object for which there is a human pronounceable name;
b. said sound generating means is a speech synthesizer means and said first activation state is a first voice activation state at which a synthesized voice is not generated and said second activation state is a second voice activation state at which a synthesized voice is generated; and
c. said second voice activation state comprises an audible series of sequentially generated synthesized voice messages corresponding to said visual series of scenes and naming said at least one object.

9. An activated work as in claim 1 wherein:
a. said second visual activation state comprises at least one letter; and
b. said second sound activation state comprises sound associated with said letter.

10. An activated work as in claim 1 wherein:
a. said second visual activation state comprises a word; and
b. said second sound activation state comprises sound associated with said word.

11. An activated work as in claim 1 wherein
a. said second visual activation state comprises a pictoral scene; and
b. said second sound activation state comprises sound associated with said pictoral scene.

12. An activated work as in claim 1 wherein said work comprises a book.

13. An activated work as in claim 1 wherein said work comprises a greeting card.

14. An activated work as in claim 1 wherein said work comprises a pamphlet.

15. An activated work as in claim 1 wherein said work comprises a game.

16. An activated work as in claim 1 wherein said visual image display means has multiple visual activation states which may be selectively activated.

17. an activated work as in claim 1 wherein said sound generating means has multiple activation states which may be selectively activated.

18. An activated work comprising:
a. at least two turnable pages pivotably attached at one edge of each of said pages so that said pages are pivotable from a juxtaposed closed position to an adjacent opened position;
b. a visual image display means affixed to one of said pages, said visual image display having a first visual activation state at which a visual image is not visible thereon and a second visual activation state at which a visual image is visible thereon;
c. a speech synthesizer means attached to said work having a first voice activation state at which a synthesized voice is not generated and a second activation state at which a synthesized voice is generated;
d. means connected to said visual display for selectively activating said visual display means from one of said visual activation states to another a delayed time period after moving said pages from said closed position to said open position or from said open position to said closed position; and
e. means connected to said speech synthesizer means for selectively activating said speech synthesizer means from one of said voice activation states to another a delayed time period after moving said pages from said closed position to said opened position or from said opened position to said closed position.

19. An activated work as in claim 18 wherein said speech synthesizer comprises:
a. an electronic circuit contained on a semiconductor chip producing electrical impulses convertable into simulated human speech, and
b. an electronically activated speaker electrically connected to said semiconductor chip for receiving said electrical impulses and converting said impulses into sound simulating human speech.

20. An activated work as in claim 18 wherein:
a. said second visual activation state comprises at least one letter; and
b. said second sound activation state comprises sound associated with said at least one letter.

21. An activated work as in claim 18 wherein:
a. said second visual activation state comprises at least one object; and b. said second sound activation state comprises sound associated with said at least one object.

22. An activated work as in claim 18 wherein:
a. said second visual activation state comprises at least one pictoral scene; and
b. said second sound activation state comprises sound associated with said at least one scene.

23. An activated work as in claim 18 wherein said work comprises a book.

24. An activated work as in claim 18 wherein said work comprises a greeting card.

25. An activated work as in claim 18 wherein said work comprises a pamphlet.

26. An activated work as in claim 18 wherein said work comprises a game.

27. An activated work as in claim 18 wherein said visual image display means has a plurality of visual activation states which may be selectively activated.

28. An activated work as in claim 18 wherein said sound generating means has multiple activation states which may be selectively activated.

29. An activated work comprising:
a. at least two turnable pages pivotably attached at one edge of each of said pages so that said pages are pivotable from a juxtaposed closed position to an adjacent opened position;
b. a visual image display means affixed to one of said pages, said visual image display having a first visual activation state at which a visual image is not visible thereon and a second visual activation state at which a visual image, including a series of sequentially occurring letters form at least one word of a message, is visible thereon;
c. a sound generating means attached to said work having a first activation state at which an audible sound is not generated and a second activation state at which audible sounds representing each letter in conjunction with its visual appearance are generated and said at least one word is sounded as if spoken after all of said letters of said at least one word visually appear;
d. means connected to said visual display for selectively activating said visual display means from one of said visual activation states to another upon pivoting said pages from said closed position to said open position or from said open position to said closed position; and
e. means connected to said sound generating means for selectively activating said sound generating means from one of said sound activation states to another upon pivoting said pages from said closed position to said opened position or from said opened position to said closed position.

30. An activated work comprising:
a. at least two turnable pages pivotably attached at one edge of each of said pages so that said pages are pivotable from a juxtaposed closed position to an adjacent opened position;
b. a visual image display means affixed to one of said pages, said visual image display having a first visual activation state at which a visual image is not visible thereon and a second visual activation state at which a visual image including at least one word with a plurality of letters simultaneously, becomes visible thereon;
c. a sound generating means attached to said work having a first activation state at which an audible sound is not generated and a second sound activation state at which audible sounds representing said at least one word is generated after all of the letters of said at least one word appear;
d. means connected to said visual display for selectively activating said visual display means from one of said visual activation states to another upon pivoting said pages from said closed position to said open position or from said open position to said closed position; and
e. means connected to said sound generating means for selectively activating said sound generating means from one of said sound activation states to another upon pivoting said pages from said closed position to said opened position or from said opened position to said closed position.

31. An activated work comprising:
a. at least two juxtaposed turnable pages,
b. a first display affixed to at least one of said two juxtaposed turnable pages, said first display representing an object and being activateable between a visible and a nonvisible state,
c. a second display representing at least one letter associated with said first display and activateable between a visible and nonvisible state, and
d. a speech synthesizer for producing a sound represented by said at least one letter after said at least one letter of said second display is activated to a visible state.

32. A work as in claim 31 wherein:
a. said second display comprises a series of letters representing one or more words, and
b. said speech synthesizer produces sounds represented by said one or more words individually after said word of said second display is activated to a visible state.

33. A method of forming an activated work comprising the steps of:
a. pivotally attaching at least two turnable pages at one edge of each of said pages so that said pages are pivotable from a juxtaposed closed position to an adjacent opened position;
b. forming a visual image display means having areas with variable electromagnetic radiation absorption characteristics;
c. affixing said visual image display means to one of said pages, such that said visual image display has a first visual activation state at which a visual image is essentially not visible and a second visual activation state at which said visual image is visible;
d. attaching, to said work, a sound generating means having a first sound activation state at which an audible sound is not generated and the second sound activation state at which an audible sound is generated;
e. connecting, to said visual display, means for selectively activating said visual display from one of said visual activation states to another upon pivoting said pages from said closed position to said opened position or from said opened position to said closed position; and
f. connecting, to said sound generating means, means for selectively activating said sound generating means from one of said sound activation states to another upon pivoting said pages from said closed position to said open position or from said open position to said closed position.

34. A method as in claim 33 further including the steps of:

a. forming a power source for selectively activating said sound generating means; and b. attaching said power source for being energized whenever the preceding page is turned to its opened position and for being de-energized whenever the preceding page is returned to its closed position.

35. A method as in claim 33 further including the step of attaching a power source for being coupled to said means for activating said visual display and said sound generating means whenever said pages are opened, and for being uncoupled from said means for activating said visual display and said sound generating means whenever said pages are closed.

36. A method as in claim 35 further comprising the steps of:

a. forming a battery on said work as said power supply, and b. interposing a switch between said battery and said means for activating said visual display and said sound generating means by opening and closing said pages.

37. A method as in claim 35 further comprising the step of coupling a photovoltaic cell to said visual display means and said sound generating means so that a voltage is generated when said pages are opened and said photovoltaic material is exposed to light.

38. A method as in claim 36 or 37 comprising the step of forming a greeting card of said work.

39. A method as in claim 33 comprising the steps of:

a. forming said second visual activation state of a series of sequentially occurring letters to form at least one word of a message; and b. forming said second sound activation state by producing sound representing each letter in conjunction with its visual appearance.

40. A method of forming an activated work comprising the steps of:

a. pivotally attaching at least two turnable pages at one edge of each of said pages so that said pages are pivotable from a juxtaposed closed position to an adjacent opened position;

b. affixing a visual image display means to one of said pages, such that said visual image display has a first visual activation state at which a visual image is essentially not visible and a second visual activation state at which said visual image is visible thereon;

c. attaching, to said work, a speech synthesizer means having a first speech activation state at which audible speech is not generated and the second speech activation state at which audible speech is generated;

d. connecting, to said visual display, means for selectively activating said visual display from one of said visual activation states to another a time delayed period after moving said pages from said closed position to said opened position or from said opened position to said closed position; and e. connecting, to said speech synthesizer means, means for selectively activating said speech synthesizer means from one of said speech activation states to another upon pivoting said pages from said closed position to said opened position or from said opened position to said closed position.

41. A method as in claim 40 further comprising the steps of:

a. forming a semiconductor chip for producing electrical impulses convertible into simulated human speech, and b. connecting an electronically activated speaker to said semiconductor chip for receiving said electrical impulses and converting the impulses into sound simulating human speech.

42. A method of forming an activated work comprising the steps of:

a. pivotably attaching at least two turnable pages at one edge of each of said pgges so that said pages are pivotable from a juxtaposed closed position to an adjacent opened position;

b. affixing a visual image display means to one of said page, said visual image display having a first visual activation state at which a visual image is not visible thereon and a second visual activation state at which a visual image is visible thereon;

c. forming said second visual activation state of a series of sequentially occurring letters to form at least one word of a message;

d. attaching, to said work, a sound generating means having a first activation state at which an audible sound is not generated and a second activation state at which an audible sound is generated;

e. forming said second sound activation state for producing sound representing each letter in conjunction with its visual appearance;

f. connecting, to said visual display, means for selectively activating said visual display from one of said visual activation states to another upon pivoting said pages from said closed position to said opened position or from said opened position to said closed position;

g. connecting, to said sound generating means, means for selectively activating said sound generating means from one of said sound activation states to another upon pivoting said pages from said closed position to said opened position or from said opened position to said closed position; and h. forming said sound generating means for producing sound representing said at least one word after all of said letters of each word visually appear.

43. A method of forming an activated work comprising the steps of:

a. pivotally attaching at least two turnable pages at one edge of each of said pages so that said pages are pivotable from a juxtaposed closed position to an adjacent opened position;

b. affixing a visual image display means to one of said page, said visual image display having a first visual activation state at which a visual image is not visible thereon and a second visual activation state at which a visual image is visible thereon;

c. forming said second visual activation state of at least one word including a plurality of letters simultaneously appearing;

d. attaching, to said work, a sound generating means having a first activation state at which an audible sound is not generated and the second activation state at which an audible sound is generated;

e. forming said second sound activation state by producing sound representing each word after all of the letters of each word appear;

f. connecting, to said visual display, means for selectively activating said visual display from one of said visual activation states to another upon pivoting said pages from said closed position to said opened position or from said opened position to said closed position; and g. connecting, to said sound generating means, means for selectively activating said sound generating means from one of said sound activation states to another upon pivoting said pages from said closed position to said opened position or from said opened position to said closed position.

44. A method of forming an activated work comprising:
   a. coupling at least two turnable pages in juxtaposed relationship,
   b. forming a first visual display of a scene, which display is activateable between a visible and non-visible state,
   c. forming a second visual display of at least one letter associated with said first display, and
   d. forming a sound generating means for producing a sound represented by said at least one letter after it is visually displayed.

45. A method as in claim 44 further including the steps of:
   a. forming a series of letters representing one or more words as said second display, and
   b. for producing sound represented by said one or more words individually after each word is displayed by said second visual display means.

46. An activated work comprising:
   a. at least two turnable pages;
   b. at least one of said turnable pages having a fixed scene on a side thereof facing another of said at least two turnable pages;
   c. at least one second scene added to and interposed with said fixed scene comprising areas thereof which are formed of a material having variable electromagnetic radiation absorption characteristics and being essentially invisible in a first state and visible in an electrically changed state;
   d. a speech synthesizer which is silent in a first activation state and which produces an audible synthesized voice corresponding to at least a portion of said fixed or said second scene in a second activation state;
   e. means on said work for producing an electrical signal when said one page is turned from a juxtaposed relationship with said other page;
   f. means for coupling said electrical signal to said areas of said second scene by turning said one page from a juxtaposed relationship with said other page such that said areas of said second scene are independently, distinctly and reversibly changed from said invisible state to said visible state; and
   g. means for coupling said electrical signal to said speech synthesizer by turning said one page from its juxtaposed relationship with said other page such that said audible simulated voice corresponding to at least a portion of said fixed or said second scene is selectably activated from said first activation state to said second activation state.

* * * * *